Patented Apr. 11, 1950

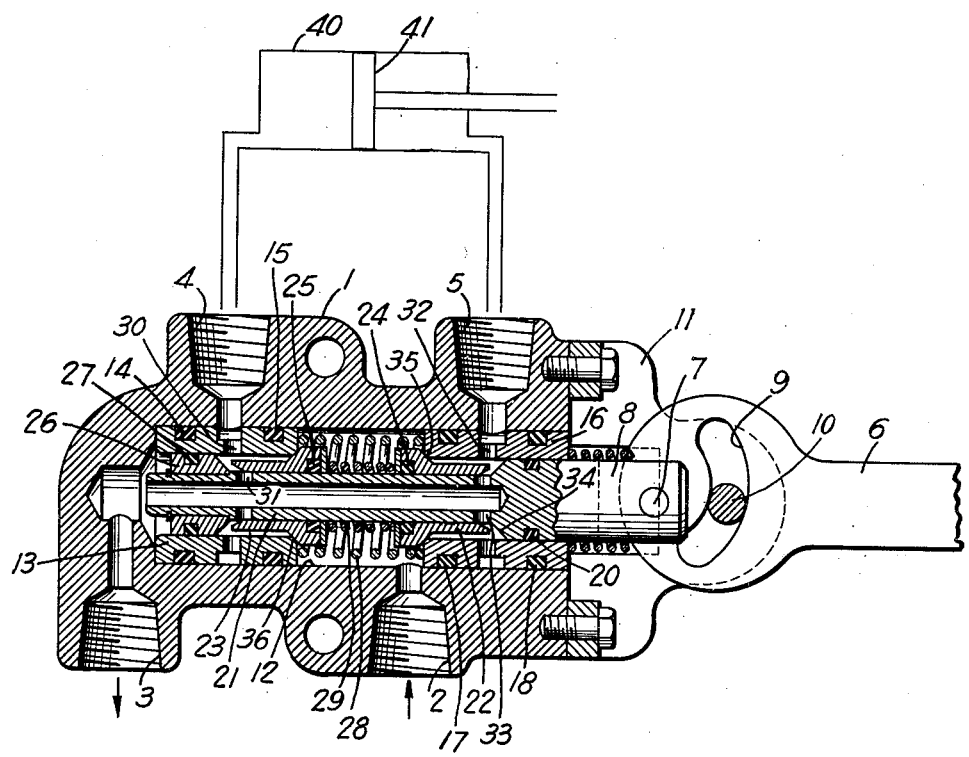

2,503,827

UNITED STATES PATENT OFFICE 2,503,827

FOUR-WAY VALVE

Herbert C. Langmore, Sherman Oaks, and Herman M. Ehrhardt, Altadena, Calif., assignors to Bendix Aviation Corporation, South Bend, Ind., a corporation of Delaware Application September 24, 1945, Serial No. 618,146

4 Claims. (Cl. 277—20)

This invention relates to control valves and more particularly to a four-way valve for use in high pressure hydraulic systems for controlling jacks and the like.

An object of the invention is to provide a particularly simple, compact and reliable four-way valve.

Another object is to provide a poppet-type four-way valve of compact construction having relatively large fluid openings.

A feature of the invention is a four-way valve comprising a body having a single bore containing two poppet inlet valves and two poppet outlet valves, all adapted to be operated in proper sequence in response to reciprocation of a single actuating member within the bore.

The foregoing, together with more specific objects and features of the invention, will become apparent from the following detailed description which refers to the drawing.

The single figure of the drawing is a longitudinal section through a valve in accordance with the invention.

Referring to the drawing, the valve depicted comprises a body 1 having a pressure fluid inlet port 2, an exhaust or return port 3 and a pair of cylinder ports 4 and 5, respectively, through which the flow of pressure and exhaust fluid is controlled by the valve. As indicated in the drawing, the ports 4 and 5 may be connected to the opposite ends of a hydraulic jack cylinder 40 having a piston 41, which is to be actuated in either direction under control of the valve.

The valve is actuated to admit pressure fluid entering the port 2 either to the cylinder port 4 or the cylinder port 5 while simultaneously connecting the other cylinder port to the exhaust port 3. The actuation of the valve is effected by swinging a lever 6, which is pivotally connected by a pin 7 to one end of a plunger 8; reciprocal with respect to the body 1, the lever 6 having an arcuate slot 9, which engages a cam pin 10, secured to a flange 11 on the body 1. When the lever 6 is swung downwardly, the plunger 8 is moved into the body, and when the lever is swung upwardly, the plunger 8 is moved out of the body. When the lever is in horizontal position, as shown, the plunger 8 is in a mid or neutral position.

The plunger 8 is positioned within a central longitudinal bore 12 extending into the body 1 from the right end. This bore 12 is connected at its inner or left end to the return port 3 and has its peripheral wall connected to the ports 4, 2 and 5 at different longitudinally spaced points. It will be observed that the port 2 is in constant communication with the mid portion of the bore 12 so that the latter is constantly filled with pressure fluid. On the other hand, the port 4 is normally isolated from the mid portion of the bore 12 by a stationary sleeve 13, which is sealed with respect to the bore 12 by sealing rings 14 and 15. The port 5 is similarly isolated from the mid portion of the bore 12 by a stationary sleeve 16 having sealing rings 17 and 18.

The plunger 8 slides in the sleeve 16 and is sealed with respect thereto by a sealing ring 20. The plunger has a small hollow stem 21 which extends substantially the full length of the bore 12, and this stem slidably supports a pair of annular poppets 22 and 23, which are adapted to seat against the sleeves 16 and 13, respectively. The poppets 22 and 23 are sealed with respect to the stem 21 by annular sealing rings 24 and 25, respectively.

The stem 21 has secured thereto, near its left end, a poppet 26, which poppet is sealed with respect to the sleeve 13 by a sealing ring 27. This poppet cooperates with the left end of the poppet 23 to control fluid flow between the cylinder port 4 and the return port 3, in a manner to be described later.

The left end 34 of the plunger 8 likewise constitutes a poppet adapted to operate with the right end of the poppet 22 for controlling flow of fluid between the cylinder port 5 and the return port 3.

A helical compression spring 28 maintains the stationary sleeves 13 and 16 in their outermost positions, as shown, in which the sleeve 13 bears against the left end of the bore 12 and the sleeve 16 bears against the face of the bracket 11. A lighter helical compression spring 29, of smaller diameter than the spring 28, is interposed between the poppets 22 and 23 and constantly urges them apart into seating engagement with the inner ends of the sleeves 13 and 16, respectively, except when they are opened in a manner to be described.

The valve operates as follows:

As shown in the drawing, the valve is in neutral position in which the port 4 is connected through radial passages 30 in the sleeve 13 and radial passages 31 in the hollow stem 21 to the interior of the stem, which is in constant communication through its open left end with the return port 3. The cylinder port 5 is similarly connected to the return port 3 through radial passages 32 in the sleeves 16 and radial passages 33 in the hollow stem 21. Hence, with the valve in neutral position both ends of the jack cylinder 40 are connected to the return port 3 and no pressure fluid is applied to the jack piston 41.

If the handle 6 is swung down to move the plunger 8 and its hollow stem 21 to the left, the connection between the cylinder port 4 and the return port 3 remains open, but the cylinder port 5 is disconnected from the return port 3 and connected to the pressure port 2, as follows:

First, the poppet face 34 on the plunger 8 contacts the right end of the poppet 22, thereby breaking the connection between the interior of the sleeve 16 and the passages 33 and disconnecting the port 5 from the return port 3. Thereafter, continued movement of the plunger 8 to the left carries the poppet 22 with it, opening the latter off the seat 35 at the left end of the sleeve 16 and permitting pressure fluid to flow from the inlet port 2 through the mid portion of the bore 12 past the seat 35 and through the radial passages 32 into the cylinder port 5. Hence, pressure fluid will be admitted through the port 5 to the right end of the jack cylinder 40, moving the piston 41 therein to the left and discharging exhaust fluid from the left end of the cylinder 40 through the cylinder port 4 and the return port 3.

On the other hand, if the handle 6 is swung upwardly to move the plunger 8 out of neutral position to the right, the corresponding movement of the hollow stem 21 first seats the poppet 26 against the left end of the poppet 23 to disconnect the cylinder port 4 from the return port 3. Thereafter, continued movement of the stem 21 and poppet 26 to the right carries the poppet 23 with it to open the latter off the seat 36 at the right end of the sleeve 13 and permit pressure fluid to flow from the inlet port 2 through the mid portion of the bore 12 into the cylinder port 4. Pressure fluid will thus be admitted to the left end of the jack cylinder 40 moving the jack piston 41 to the right and exhausting fluid from the right end of the jack cylinder through the cylinder port 5 and the return port 3.

The valve construction described is well adapted for manufacture because the body 1 is extremely simple and does not involve difficult machining operations. Thus, it will be observed that the bore 12 in the body is of uniform diameter throughout and can be readily machined to proper size. The sleeves 13 and 16 are likewise relatively simple parts to make as are the poppet 26, and the poppets 23 and 22. Assembly and disassembly of the elements is very easily accomplished by sliding the whole inner assembly into and out of the body 12, while the bracket 11 is removed. The valve is particularly suited for high pressure operation because poppet valves, as distinct from sliding valves, are employed throughout. As is well known, it is difficult and expensive to build sliding valves with sufficiently small clearance to avoid appreciable leakage of fluid under high pressures.

Although for the purpose of explaining the invention a specific embodiment thereof has been described in detail, various changes from the exact construction shown, can be made without departing from the invention, which is thereby limited only to the extent set forth in the appended claims.

We claim:

1. In a valve, the combination of: a housing having a bore therein; a reciprocal control shaft in said bore; means in said bore longitudinally dividing it into a pair of end chambers adapted to be connected to a pair of fluid lines leading to a fluid pressure actuated device to be controlled by said valve, and a middle chamber adapted to be connected to a source of pressure fluid, said means including first and second annular poppets slidable on said shaft in sealing relation therewith for normally blocking fluid flow from said middle chamber to said end chambers but movable independently in opposite directions to permit said flow; a third poppet movable by said shaft against said first poppet to open it in response to movement of said shaft in one direction; a fourth poppet movable by said shaft against said second poppet to open it in response to movement of said shaft in the other direction; and means defining an exhaust duct; the cooperating contact faces of said first and third poppets controlling fluid flow between one of said end chambers and said exhaust duct, and the cooperating contact faces of said second and fourth poppets controlling fluid flow between the other end chamber and said exhaust duct.

2. A valve of the type described comprising: a body having a bore extending thereinto from one end, and having a return port communicating with the inner end of said bore; a hollow stem member smaller than said bore and extending into said bore; means movably supporting said stem member in sealing relation with respect to said bore adjacent opposite ends of the bore, the inner end of said hollow stem member being open for communication with the inner end of said bore and said return port; first and second spaced-apart stationary valve elements in said bore; said body having a pressure port communicating with said bore intermediate said stationary valve elements; first and second stem valve elements movable with said stem and spaced beyond said stationary valve elements; a first control port communicating with said bore between said first stationary valve element and said first stem valve element, and a second control port communicating with said bore between said second stationary valve element and said second stem valve element; a first port in said hollow stem member communicating the interior of said stem member with said bore between said first stationary and said first stem valve elements, and a second port in said hollow stem member communicating the interior of said stem member with said bore between said second stationary and stem valve elements; first and second annular valve elements surrounding said stem in slidable sealing relation therewith for movement toward each other from outer positions in which they seat respectively against said first and second stationary valve elements; said first annular valve element having its outer end normally spaced from said first stem valve element to communicate said first control port with said first stem port, and said second annular valve element having its outer end normally spaced from said second stem valve element to communicate said second control port with said second stem port; movement of said stem member in either direction from normal position first closing one of said stem valve elements against its associated annular valve element to interrupt communication between the interior of said hollow stem member and the associated control port and thereafter moving the associated annular valve element clear of the associated stationary valve element to admit pressure fluid from the intermediate portion of said bore into the associated control port.

3. In a four-way valve the combination of: a casing means defining a pair of control chambers to which fluid is to be supplied, said chambers being aligned with each other and having poppet seats at their inner ends and defining a pressure fluid chamber intermediate said poppet seats; a pair of annular poppet elements aligned with said seats and normally closed thereagainst for preventing fluid flow from said pressure fluid chamber to said control chambers; a reciprocal control member extending through said chambers and said poppet elements and in sealing relation with said poppet elements; said reciprocal control member comprising a hollow shaft constituting an exhaust duct; means responsive to movement of said control member in one direction for unseating one of said poppet elements and responsive to movement of said control member in the other direction for unseating the other poppet element, said unseating elements comprising a pair of annular cooperating seating surfaces on said control member and the associated poppet element respectively, said hollow shaft having ports in its wall communicating with each control chamber past the said annular cooperating seating surfaces, whereby each control member is connected to said exhaust duct when the said annular cooperating seating surfaces associated with that control chamber are out of contact with each other.

4. A valve according to claim 2 in which said first and second spaced-apart stationary valve elements are integral with said means movably supporting said stem member in sealing relation with respect to said bore adjacent opposite ends of the bore.

HERBERT C. LANGMORE.
HERMAN M. EHRHARDT.

REFERENCES CITED

The following references are of record in the file of this patent:

UNITED STATES PATENTS

| Number | Name | Date |
| --- | --- | --- |
| 1,645,751 | Graffinberger | Oct. 18, 1927 |

FOREIGN PATENTS

| Number | Country | Date |
| --- | --- | --- |
| 278,814 | Germany | Oct. 6, 1914 |